(12) United States Patent
Sun et al.

(10) Patent No.: US 11,633,058 B2
(45) Date of Patent: Apr. 25, 2023

(54) SELF-SERVICE PARCEL CABINET

(71) Applicant: Xi'an Jingdong Tianhong Technology Co., Ltd., Xi'an (CN)

(72) Inventors: Xuejun Sun, Beijing (CN); Yong Sun, Beijing (CN); Yuping Shi, Beijing (CN); Zheng Cui, Beijing (CN); Yanguang Liu, Beijing (CN)

(73) Assignee: Xi'an Jingdong Tianhong Technology Co., Ltd., Xi'an (CN)

( * ) Notice: Subject to any disclaimer, the term of this patent is extended or adjusted under 35 U.S.C. 154(b) by 121 days.

(21) Appl. No.: 17/270,073

(22) PCT Filed: Aug. 7, 2019

(86) PCT No.: PCT/CN2019/099575
§ 371 (c)(1),
(2) Date: Feb. 22, 2021

(87) PCT Pub. No.: WO2020/063120
PCT Pub. Date: Apr. 2, 2020

(65) Prior Publication Data
US 2021/0321810 A1 Oct. 21, 2021

(30) Foreign Application Priority Data
Sep. 29, 2018 (CN) .......................... 201811145057.5

(51) Int. Cl.
*A47G 29/30* (2006.01)
*B64F 1/32* (2006.01)
(Continued)

(52) U.S. Cl.
CPC .......... *A47G 29/30* (2013.01); *A47G 29/141* (2013.01); *B07C 3/08* (2013.01); *B64F 1/324* (2020.01); *G07F 17/13* (2020.05)

(58) Field of Classification Search
CPC .................. A47G 29/141; A47G 29/30; A47G 2029/149; B64F 1/324; B64F 1/32;
(Continued)

(56) References Cited

U.S. PATENT DOCUMENTS 9,745,130 B1 * 8/2017 Rawal ................ G06Q 10/0875
9,815,633 B1   11/2017 Kisser et al.
(Continued)

FOREIGN PATENT DOCUMENTS

| CN | 104843408 A | 8/2015 |
| CN | 206032353 U | 3/2017 |

(Continued)

OTHER PUBLICATIONS

International Search Report and Written Opinion for International Application No. PCT/CN2019/099575, dated Oct. 25, 2019, 5 pages.

*Primary Examiner* — William L Miller
(74) *Attorney, Agent, or Firm* — RatnerPrestia

(57) ABSTRACT

A self-service parcel cabinet, comprising: a main-body part (1), a sorting apparatus (2), a parking apparatus (3), and a control device. The main-body part is a hollow structure opened at the top. At least part of the hollow structure is formed by multiple self-service parcel lockers (11) surroundingly arranged. The parking apparatus is provided on top of the main-body part and comprises a drone landing pad (31). Provided on the drone landing pad is a channel allowing passing of a parcel delivered by the drone and directly facing the opening at the top. The sorting apparatus is provided within the hollow structure, communicatively connected to the control device, and capable of, when a parcel receiving instruction transmitted by the control device is received, receiving according to the parcel receiving instruction a parcel delivered by the drone, and, when a first sorting instruction transmitted by the control device is
(Continued)

received, transferring according to the first sorting instruction the receive parcel into a self-service locker of the self-service cabinet.

17 Claims, 5 Drawing Sheets

(51) Int. Cl.
*A47G 29/14* (2006.01)
*B07C 3/08* (2006.01)
*G07F 17/12* (2006.01)

(58) Field of Classification Search
CPC ......... B07C 3/08; B65G 1/1373; G07F 11/38; G07F 11/62; G07F 11/1653; G07F 17/10; G07F 17/13; B64C 39/024; B64C 2201/128; B64D 1/02; B64D 1/12; G06Q 10/0836; G06Q 50/28
USPC ....... 232/43.1, 25, 19, 45; 244/114 R, 118.1, 244/118.2, 137.1, 137.4
See application file for complete search history.

(56) References Cited

U.S. PATENT DOCUMENTS

| | | | | |
|---|---|---|---|---|
| 10,114,996 | B2* | 10/2018 | Lossov | G07F 17/0014 |
| 10,835,070 | B2* | 11/2020 | Russell | B65G 51/04 |
| 10,888,189 | B2* | 1/2021 | Pointeau | G06Q 10/08 |
| 11,191,382 | B2* | 12/2021 | Likins | A47G 29/1209 |
| 11,447,335 | B2* | 9/2022 | Wang | B60W 60/00256 |
| 2013/0264381 | A1* | 10/2013 | Kim | G07F 17/13 232/24 |
| 2013/0338822 | A1* | 12/2013 | Gibson, Jr. | G07F 17/12 700/237 |
| 2015/0186840 | A1* | 7/2015 | Torres | A47F 10/02 705/339 |
| 2016/0257423 | A1* | 9/2016 | Martin | B64C 39/024 |
| 2018/0304311 | A1* | 10/2018 | Must | B07C 3/087 |
| 2019/0125116 | A1* | 5/2019 | Russell | B64F 1/12 |
| 2019/0233135 | A1* | 8/2019 | Cantrell | B64F 1/005 |
| 2019/0320834 | A1* | 10/2019 | Tovey | F24F 5/0096 |
| 2019/0325683 | A1* | 10/2019 | Tovey | A47G 29/141 |
| 2019/0344965 | A1* | 11/2019 | Wilkinson | G07F 11/42 |
| 2019/0370744 | A1* | 12/2019 | Fee | G06Q 10/0836 |
| 2020/0012245 | A1* | 1/2020 | Marin Pulido | G06K 7/1417 |
| 2020/0293990 | A1* | 9/2020 | Mak | G06K 7/10366 |
| 2021/0142277 | A1* | 5/2021 | Fee | G07C 9/00571 |
| 2021/0196069 | A1* | 7/2021 | Likins | A47G 29/16 |
| 2021/0214159 | A1* | 7/2021 | Tazume | B65G 1/0435 |
| 2021/0259449 | A1* | 8/2021 | Roselló Ciscar | G07F 9/0235 |
| 2021/0284450 | A1* | 9/2021 | Wang | B64F 1/005 |
| 2021/0284451 | A1* | 9/2021 | Burchat | B65G 11/203 |
| 2021/0370988 | A1* | 12/2021 | Cheng | B60P 3/007 |
| 2022/0245373 | A1* | 8/2022 | Lössov | G07F 11/42 |
| 2022/0275990 | A1* | 9/2022 | Tazume | A47G 29/141 |

FOREIGN PATENT DOCUMENTS

| | | | | |
|---|---|---|---|---|
| CN | 206348838 | U | 7/2017 | |
| CN | 107720069 | A | 2/2018 | |
| CN | 107730758 | A | 2/2018 | |
| CN | 207046204 | U | 2/2018 | |
| CN | 108305407 | A | 7/2018 | |
| CN | 207810398 | U | 9/2018 | |
| CN | 207851985 | U | 9/2018 | |
| CN | 108945918 | A | 12/2018 | |
| CN | 109795834 | A * | 5/2019 | |
| CN | 109805724 | A * | 5/2019 | |
| CN | 108669844 | B * | 6/2020 | ............ A47B 53/02 |
| DE | 20011842 | U1 | 3/2001 | |
| JP | 62244807 | A | 10/1987 | |
| JP | 2000344303 | A | 12/2000 | |
| JP | 2001088908 | A | 4/2001 | |
| WO | 2017173311 | A1 | 10/2017 | |

* cited by examiner

SELF-SERVICE PARCEL CABINET

CROSS-REFERENCE TO RELATED APPLICATIONS

This patent application is a U.S. National Phase Application under 35 U.S.C. 371 of International Application No. PCT/CN2019/099575 filed Aug. 7, 2019, which claims priority of Chinese Patent Application No. 201811145057.5, filed on Sep. 29, 2018, the entire contents of each of which are herein incorporated by reference.

TECHNICAL FIELD

Embodiments of the present disclosure relate to the technical field of logistics, and particularly to a self-service parcel cabinet.

BACKGROUND

As more and more users shop online, in order to facilitate users to pick up parcels, self-service parcel cabinets are usually set up within a certain range of users' lives. However, couriers are still required to deliver the parcels to the self-service parcel cabinets, which has been unable to meet the requirements for unmanned express delivery.

SUMMARY

Embodiments of the present disclosure provide a self-service parcel cabinet.

Embodiment of the present disclosure provide a self-service parcel cabinet, including: a main-body part, a sorting apparatus, a parking apparatus and a control apparatus; the main-body part is a hollow structure with an opening at top, and at least part of the hollow structure is formed by a plurality of self-service parcel lockers surroundingly arranged; the parking apparatus is provided on the top of the main-body part and comprises a drone landing pad for parking a drone, and a channel is provided at the drone landing pad, the channel allowing passing of a parcel delivered by the drone and directly facing the opening at the top; the sorting apparatus is provided within the hollow structure, communicatively connected with the control apparatus, and is configured to receive, in response to receiving a parcel receiving instruction transmitted by the control apparatus, the parcel delivered by the drone according to the parcel receiving instruction, and transfer, in response to receiving a first sorting instruction transmitted by the control apparatus, the received parcel into a self-service parcel locker of the self-service parcel cabinet according to the first sorting instruction.

In some embodiments, the sorting apparatus comprises a pallet, a rotation driving mechanism, a lifting mechanism, a first driving mechanism, and a second driving mechanism; the pallet is mounted on the lifting mechanism and configured to receive the parcel delivered by the drone; the lifting mechanism is mounted on the first driving mechanism and configured to drive the pallet to ascend and descend in the vertical direction; the first driving mechanism is mounted on the rotation driving mechanism, and the rotation driving mechanism is capable of driving the first driving mechanism to rotate about an axis parallel to the vertical direction; and the second driving mechanism is mounted on the first driving mechanism, the second driving mechanism is driven by the first driving mechanism to move in the vertical direction, and the second driving mechanism is located above the lifting mechanism and is movable in the horizontal direction to transfer the parcel received by the pallet to the self-service parcel locker of the self-service parcel cabinet.

In some embodiments, the rotation driving mechanism comprises a base, a bottom plate, a top plate, and at least two guide rods; the bottom plate and the top plate are arranged opposite to each other up and down, the bottom plate is mounted on the base and is capable of rotating about a central axis perpendicular to the base, and the top plate is provided with a through hole allowing the pallet to pass through; two ends of the guide rods are respectively fixed on the bottom plate and the top plate; and the first driving mechanism is slidably connected to the guide rods.

In some embodiments, the top plate comprises a first top plate, at least three rollers, and a second top plate sequentially arranged from bottom to top; an upper surface of the second top plate is fixed on the drone landing pad, and the guide rods are fixed on a lower surface of the first top plate; the at least three rollers are held on an upper surface of the first top plate, and the at least three rollers are located on the same circumference whose center is on the central axis; a circular groove is provided on a lower surface of the second top plate, and the rollers are located in the circular groove and are capable of rolling along the circular groove; or the at least three rollers are held on the lower surface of the second top plate, and the at least three rollers are located on the same circumference whose center is on the central axis; a circular groove is provided on the upper surface of the first top plate, and the rollers are located in the circular groove and are capable of rolling along the circular groove.

In some embodiments, the first driving mechanism comprises sliding components, a bracket with a guide rail, and a supporting component; the number of the sliding components matches the number of the guide rods, and the sliding components are slidably connected to the at least two guide rods respectively; the bracket is mounted on the sliding components and located between the at least two guide rods, and the second driving mechanism is mounted on the guide rail and is capable of sliding along the guide rail; and the supporting component is mounted on the bracket, and the lifting mechanism is mounted on the supporting component.

In some embodiments, the second driving mechanism comprises a first support and a second support arranged at the same height; the space between the first support and the second support is capable of allowing the pallet to ascend or descend; the pallet descends under the action of the lifting mechanism when receiving the parcel, and the parcel is placed on the first support and the second support; and the bottom of the self-service parcel locker is provided with a receiving portion for receiving the parcel transferred by the sorting apparatus, the height of the receiving portion is greater than the heights of the first support and the second support, and the width of the receiving portion is smaller than the width between the first support and the second support.

In some embodiments, the second driving mechanism further comprises a third support and a fourth support; and the third support and the fourth support are located above the first support and the second support and on both sides away from each other, the width between the third support and the fourth support is greater than the width of the parcel.

In some embodiments, the parking apparatus is communicatively connected with the control apparatus.

In some embodiments, the drone landing pad comprises an openable hatch, and the hatch is directly facing the opening at the top of the main-body part; and the drone landing pad is configured to, in response to receiving a first opening or closing instruction transmitted by the control apparatus, open or close the hatch according to the first opening or closing instruction.

In some embodiments, the parking apparatus further comprises a position adjusting apparatus; and the position adjusting apparatus is configured to, when the drone lands on the drone landing pad, in response to receiving an adjustment instruction transmitted by the control apparatus, adjust the drone to a position directly facing the channel according to the adjustment instruction.

In some embodiments, the position adjusting apparatus comprises a transmission mechanism and push rods; and the transmission mechanism is mounted on the drone landing pad and configured to drive the push rods to move so as to push the drone and adjust the position of the drone.

In some embodiments, the transmission mechanism comprises a motor, four rollers, and four conveyor belts; the four rollers are respectively located on four rectangular vertices of the drone landing pad, the conveyor belts are respectively sleeved on every two adjacent rollers, and a rotating shaft of the motor is connected with one of the rollers to drive the roller to rotate and drive the conveyor belts and the other three rollers to move; and four push rods are provided arranged in a tic-tac-toe shape, and two ends of each push rod are respectively connected to the opposite conveyor belts, so that the conveyor belts is capable of driving each push rod to simultaneously move toward or away from the center of the drone landing pad.

In some embodiments, the parking apparatus further comprises an openable rain shed; and the rain shed is configured to, in response to receiving a second opening or closing instruction transmitted by the control apparatus, open or close according to the second opening or closing instruction, the rain shed is opened to cover the drone landing pad, and the rain shed is closed to be located on one side of the drone landing pad.

In some embodiments, a back plate of the self-service parcel locker is a retractable baffle; at least part of the hollow structure is formed by the back plate; and the baffle is communicatively connected with the control apparatus, and is configured to, in response to receiving an extension or retraction instruction transmitted by the control apparatus, extend or retract according to the extension or retraction instruction.

In some embodiments, the cross section of the outside surface of the main-body part is polygonal.

In some embodiments, the self-service parcel cabinet further comprises an unmanned vehicle garage, and the unmanned vehicle garage is communicated with the hollow structure of the main-body part; and the sorting apparatus is further configured to: when an unmanned vehicle is parked in the unmanned vehicle garage, in response to receiving a second sorting instruction transmitted by the control apparatus, transfer the received parcel delivered by the drone to the unmanned vehicle according to the second sorting instruction.

In some embodiments, a charging apparatus is provided in the unmanned vehicle garage.

In some embodiments, a display screen for human-computer interaction is further provided on the outside surface of the main-body part.

In some embodiments, a skirt hem is provided on the top of the main-body part, and a lighting apparatus is provided on the skirt hem.

The self-service parcel cabinet according to embodiments of the present disclosure may include a main-body part, a sorting apparatus, a parking apparatus and a control apparatus. The main-body part is a hollow structure with an opening at the top. At least part of the hollow structure is formed by a plurality of self-service parcel lockers. The parking apparatus is provided on top of the main-body part and includes a drone landing pad. A channel allowing passing of a parcel delivered by the drone and directly facing the opening at the top provided at the drone landing pad. The sorting apparatus is provided within the hollow structure, communicatively connected to the control apparatus, and capable of, when a parcel receiving instruction transmitted by the control apparatus is received, receiving a parcel delivered by the drone according to the parcel receiving instruction, and, when a first sorting instruction transmitted by the control apparatus is received, transferring the received parcel into a self-service locker of the self-service parcel cabinet according to the first sorting instruction. The control apparatus is configured to transmit the parcel receiving instruction and the first sorting instruction to the sorting apparatus to control the sorting apparatus. The self-service parcel cabinet with the above structure facilitates the drone to land by providing the drone landing pad on the top of the main-body part. The sorting apparatus is provided within the main-body part, and the control apparatus controls the sorting apparatus to receive a parcel delivered by the drone and transfer the parcel to a corresponding self-service parcel locker. In this way, the transfer of the parcel delivered by the drone to the self-service parcel locker does not require any courier at all, and the automation of parcel delivery is effectively implemented.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The principles and features of the present disclosure will be further described in detail below with reference to the drawings and embodiments. It can be understood that the specific embodiments described here are only used to explain the related invention, but not to limit the invention. It should also be noted that in order to facilitate description, the drawings only show parts related to the invention.

It should be noted that the embodiments in the present disclosure and the features in the embodiments may be combined with each other on a non-conflict basis. Herein-after, the present disclosure will be described in detail with reference to the drawings in combination with embodiments.

Figure 1:
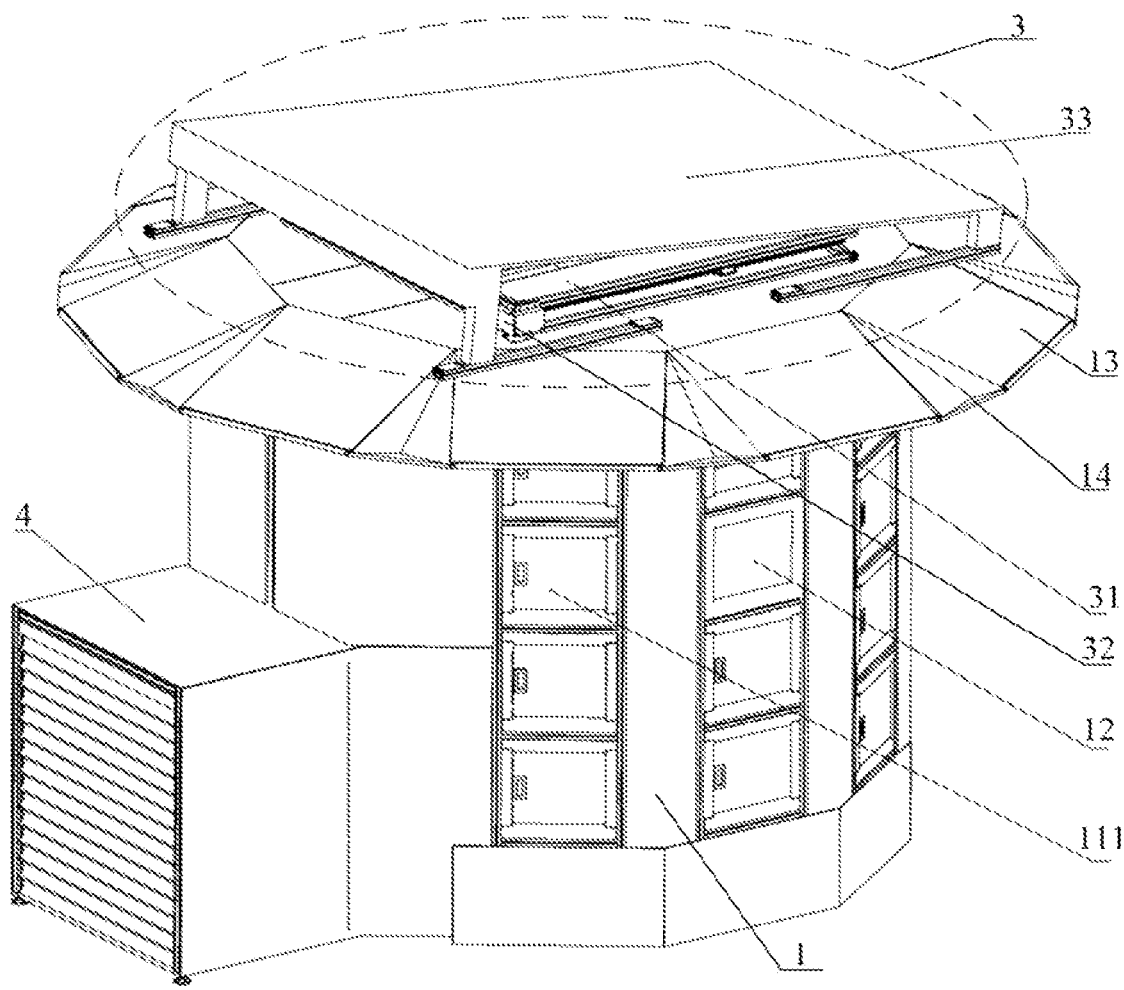
FIG. 1 is a schematic structural diagram of a self-service parcel cabinet according to an embodiment of the present disclosure.
Figure 2:
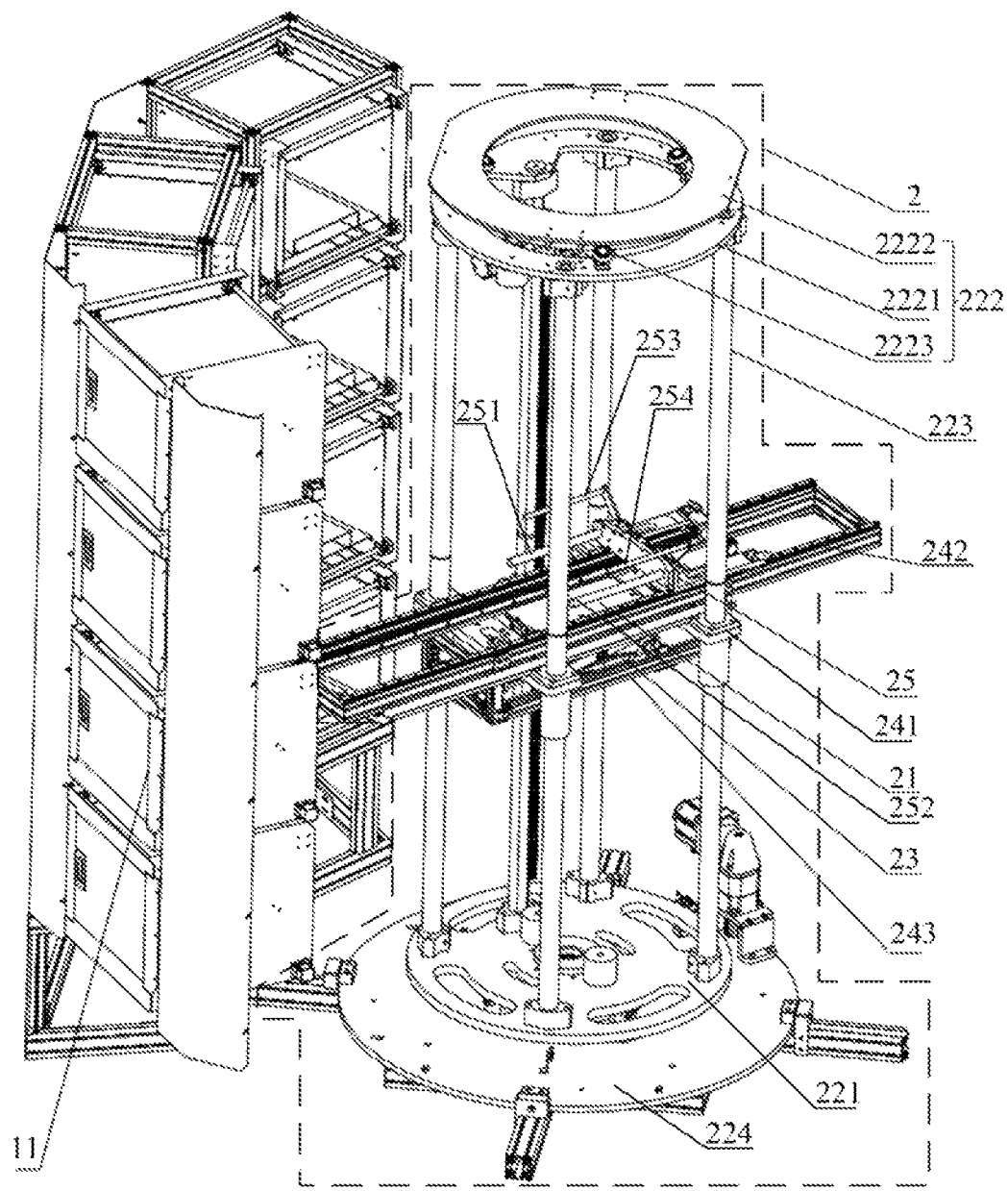
FIG. 2 is a schematic structural diagram of the inside of the self-service parcel cabinet according to an embodiment of the present disclosure.

Refer to FIG. 1 and FIG. 2, which show a schematic structural diagram of a self-service parcel cabinet and a schematic diagram of an internal structure of the self-service parcel cabinet according to an embodiment of the present disclosure. The self-service parcel cabinet in this embodiment may include a main-body part 1, a sorting apparatus 2, a parking apparatus 3 and a control apparatus.

In this embodiment, the main-body part 1 is a hollow structure with an opening provided at the top. At least part of the hollow structure is formed by a plurality of self-service parcel lockers 11. The self-service parcel lockers 11 are used to store parcels.

In this embodiment, the parking apparatus 3 is provided on the top of the main-body part 1 and includes a drone landing pad 31. The drone landing pad 31 is used to park a drone. The specific structure of the drone landing pad 31 is not limited in the present disclosure. For example, the drone landing pad 31 may be a circular or rectangular structure. Provided on the drone landing pad 31 is a channel allowing passing of a parcel delivered by a drone and directly facing the opening at the top of the main-body part 1. It is understandable that a parcel delivered by the drone can enter the interior of the main-body part 1 through the channel of the drone landing pad 31.

In this embodiment, the sorting apparatus 2 is provided within the hollow structure of the main-body part 1. The sorting apparatus 2 is communicatively connected to the control apparatus, and is capable of receiving a parcel receiving instruction transmitted by the control apparatus, and receiving a parcel delivered by the drone according to the parcel receiving instruction. The sorting apparatus 2 is also capable of receiving a first sorting instruction transmitted by the control apparatus, and transferring the received parcel into a self-service parcel locker 11 of the self-service parcel cabinet according the first sorting instruction. Here, the self-service parcel locker 11 to which the sorting apparatus 2 transfers the parcel may be a corresponding self-service parcel locker preset by the control apparatus according to the type or size of the parcel. As an example, the control apparatus selects the self-service parcel locker according to the size of the parcel, and controls the parcel sorting apparatus 2 to transfer a large-sized parcel into a large self-service parcel locker. The self-service parcel locker 11 to which the sorting apparatus 2 transfers the parcel may also be any self-service parcel locker in which no parcel is placed. As an example, a photoelectric sensor may be provided within the self-service parcel locker 11, and the photoelectric sensor feeds back to the control apparatus whether there is any parcel in the self-service parcel locker 11. When receiving a signal indicating that there is no parcel in a self-service parcel locker 11, the control apparatus may control the sorting apparatus 2 to transfer a parcel to the self-service parcel locker 11.

In this embodiment, the sorting apparatus 2 can be any apparatus that can be controlled by the control apparatus and is capable of transferring parcels. The present disclosure does not limit its specific structure. For example, an apparatus capable of implementing parcel delivery in the prior art may be used.

In this embodiment, the control apparatus may transmit a parcel receiving instruction and a first sorting instruction to the sorting apparatus 2, to control the sorting apparatus 2. The present disclosure does not limit the specific position of the control apparatus.

In an application scenario, a drone carrying a parcel first lands on the drone landing pad 31. Then, the sorting apparatus 2 receives a parcel receiving instruction transmitted by the control apparatus, and moves to the position of the channel of the drone landing pad 31 according to the parcel receiving instruction. At this time, the drone unloads the parcel onto the sorting apparatus 2. After that, the sorting apparatus 2 receives a first sorting instruction transmitted by the control apparatus, and then according to the first sorting instruction, the sorting apparatus 2 carries the parcel to pass through the channel of the drone landing pad 31 and to enter into the main-body part 2, and delivers the parcel to a corresponding self-service parcel locker.

The self-service parcel cabinet in this embodiment facilitates the drone to land by providing the drone landing pad 3 on the top of the main-body part. The sorting apparatus 2 is provided within the main-body part 1, and the control apparatus controls the sorting apparatus 2 to receive a parcel delivered by the drone and transfer the parcel to the corresponding self-service parcel locker 11. In this way, the transfer of the parcel delivered by the drone to the self-service parcel locker does not require any courier at all, and the automation of parcel delivery is effectively implemented.

In the present disclosure, the shape of the main-body part 1 is not limited herein. Optionally, the main-body part 1 may be a cylindrical structure. Optionally, continuing to refer to FIG. 1, the cross section of the outside surface of the main-body part 1 may be polygonal. The present disclosure does not limit the number of edges of the polygon. For example, the cross section of the outside surface of the main-body part 1 in the present disclosure may be octagonal, decagonal, or the like. The structure of the main-body part may be configured according to actual needs. The cross section of the outside surface of the main-body part 1 is polygonal, which facilitates the installation of the self-service parcel lockers 11. It can be understood that the edges of the polygon are at least partly formed by the self-service parcel lockers. With this structure, the number of the self-service parcel lockers 11 can be increased, and the space can be reasonably used.

Figure 3:
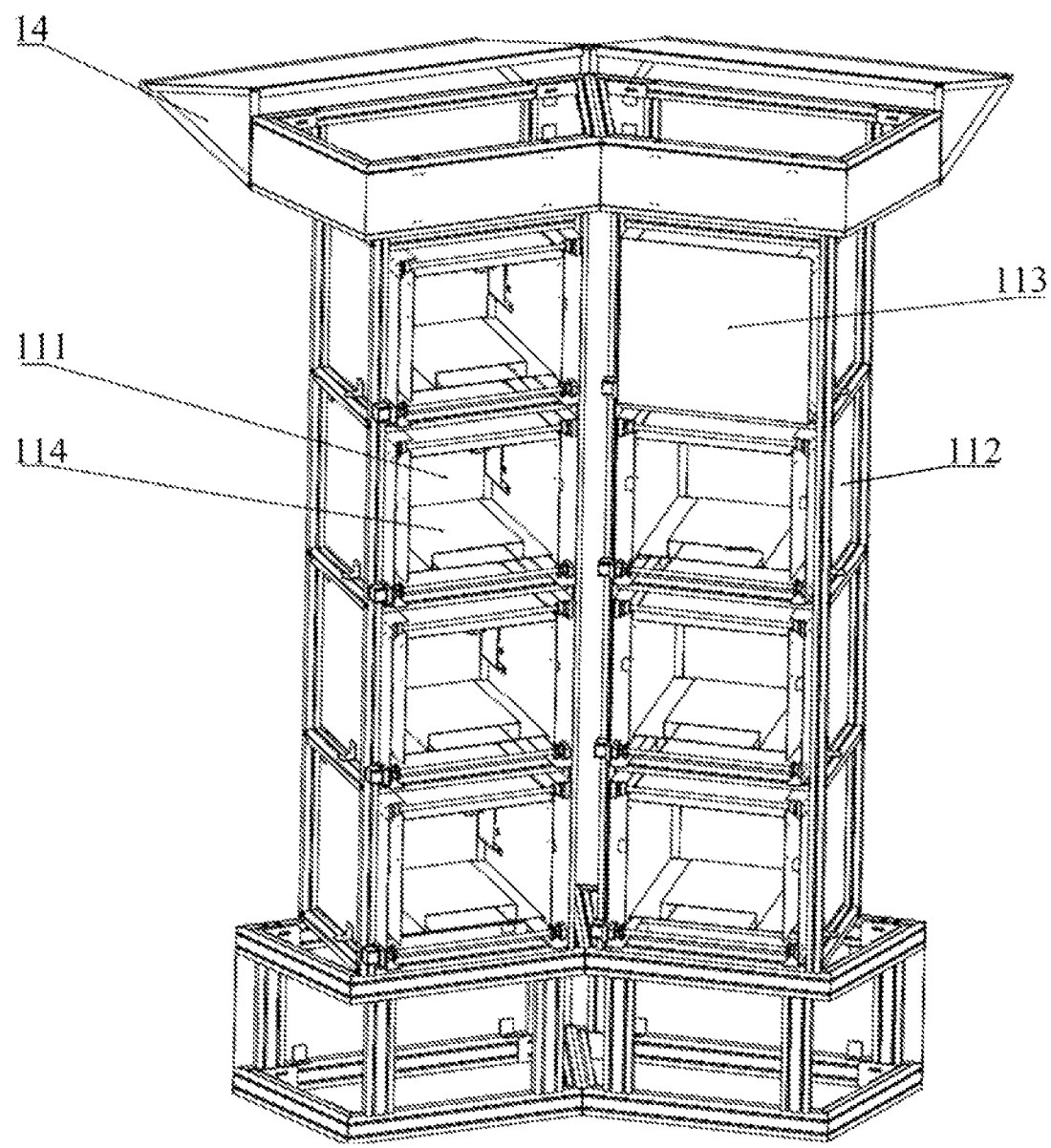
FIG. 3 is a schematic diagram of an internal structure of a main-body part of the self-service parcel cabinet according to an embodiment of the present disclosure.

In some optional implementations of this embodiment, as shown in FIG. 3, a back plate of the self-service parcel locker 11 is a retractable baffle 113. The baffle 113 and the locker door 111 are arranged at openings at both ends of a locker body 112. At least part of the hollow structure is formed by the back plates of the self-service parcel lockers 11. The baffle 113 is communicatively connected with the control apparatus, and is capable of extending or retracting according to the received extension or retraction instruction transmitted by the control apparatus. As an example, the retractable baffle 113 may be a roller blind structure, and may include a motor, a reel and a moisture-proof cloth. The motor is capable of driving the reel to rotate according to a control instruction transmitted by the control apparatus, so that the moisture-proof cloth can retract or extend according to the rotation of the reel. The arrangement of the baffle 113 may prevent the parcel in the self-service parcel locker 11 from being damaged by moisture.

It should be noted that the size of the self-service parcel locker 11 is not limited in the present disclosure. It is assumed that the self-service parcel lockers 11 may be of the same size or different sizes.

In some optional implementations of this embodiment, continuing to refer to FIG. 2, the sorting apparatus 2 may include a pallet 21, a rotation driving mechanism, a lifting mechanism 23, a first driving mechanism and a second driving mechanism 25. The pallet 21 is mounted on the lifting mechanism 23 and can be fixedly connected with the lifting mechanism 23, and the pallet 21 is capable of receiving a parcel delivered by the drone. The lifting mechanism 23 is mounted on the first driving mechanism, and is capable of driving the pallet 21 to ascend and descend in the vertical direction. The first driving mechanism is mounted on the rotation driving mechanism, and the rotation driving mechanism is capable of driving the first driving mechanism to rotate about an axis parallel to the vertical direction. The second driving mechanism 25 is mounted on the first driving mechanism, and the second driving mechanism 25 may be driven by the first driving mechanism to move in the vertical direction. The second driving mechanism 25 is located above the lifting mechanism 23, and is movable in the horizontal direction to transfer the parcel received by the pallet 23 to a self-service parcel locker 11 of the self-service parcel cabinet.

Further, the rotation driving mechanism includes a base 224, a bottom plate 221, a top plate 222, and at least two guide rods 223. The bottom plate 221 and the top plate 222 are arranged opposite to each other up and down. The bottom plate 221 is mounted on the base 224 and is capable of rotating about a central axis perpendicular to the base 224. The top plate 222 is provided with a through hole allowing the pallet 21 to pass through. Two ends of the guide rods 223 are respectively fixed on the bottom plate 221 and the top plate 222. The first driving mechanism may be slidably connected to the guide rods 223, to realize the vertical movement of the first driving mechanism along the guide rods. It can be understood that the base 26 may be fixed on the ground to maintain the stability of the entire sorting apparatus 2.

Further, continuing to refer to FIG. 2, the top plate 222 includes a first top plate 2221, at least three rollers 2223, and a second top plate 2222 sequentially arranged from bottom to top. The at least three rollers 2223 are held on an upper surface of the first top plate 2221. The rollers 2223 are located on the same circumference whose center is on the central axis of the base 224. A circular groove is provided on a lower surface of the second top plate 2222, and each roller 2223 is located in the circular groove and is capable of rolling along the circular groove. An upper surface of the second top plate 2222 is fixed on the drone landing pad 31, and the guide rods 223 are fixed on a lower surface of the first top plate 2221. In this way, when the rotation driving mechanism rotates, because the rollers 2223 are on the same circumference whose center is on the central axis of the base 224, it can be ensured that the second top plate 2222 also rotates about the central axis of the base 224. The bottom plate 221 and the second top plate 2222 share the same central axis of rotation, to ensure the stability of rotation.

It is understandable that, optionally, the at least three rollers 2223 are held on the lower surface of the second top plate 2222, and the rollers 2223 are located on the same circumference whose center is on the central axis of the base 224; a circular groove is provided on the upper surface of the first top plate 2221, and the rollers 2223 are located in the circular groove and are capable of rolling along the circular groove, which can also achieve the above effects. Details are not described herein again. Further, the first driving mechanism may include sliding components 241, a bracket 242 with a guide rail, and a supporting component 243. The number of the sliding components 241 matches the number of the guide rods 223. Usually, the numbers of the two are the same. The sliding components 241 are slidably connected to the guide rods 223r, respectively. The bracket 242 is mounted on the sliding components 241 and may be fixedly connected with the sliding components 241. The bracket 242 is located between the at least two guide rods 223. The second driving mechanism 25 is mounted on the guide rail of the bracket 242, and is capable of sliding along the guide rail, to realize horizontal movement. The supporting component 243 is mounted on the bracket 242, and the lifting mechanism 23 is mounted on the supporting component 243. In this way, the sliding components 241 may drive the bracket 242 and the supporting component 243 to slide along the guide rods 241, and to be fixed at any positions of the guide rods 241.

Further, the second driving mechanism 25 includes a first support 251 and a second support 252 arranged at the same height. The space between the first support 251 and the second support 252 is capable of allowing the pallet 21 to ascend or descend. The pallet 21 ascends or descends under the lifting effect of the lifting mechanism 23, and may pass through the space between the first support 251 and the second support 252. That is, the width between the first support 251 and the second support 252 is greater than the width of the pallet 21. The pallet 21 receives a parcel, and the parcel can be placed on the first support 251 and the second support 252 during the descending process under the action of the lifting mechanism. It can be understood that the width between the first support 251 and the second support 252 should be smaller than the width of the parcel, so that the parcel can be placed on the first support 251 and the second support 252. In an actual working state, under the action of the lifting mechanism 23, the pallet 21 may pass through the space between the first support 251 and the second support 252 and then pass through the though hole of the top plate 22, to receive the parcel delivered by the drone. After the pallet 21 receives the parcel, the lifting mechanism 23 drives the pallet 21 to descend, and the parcel is placed on the first support 251 and the second support 252. Then, the parcel are moved to the position facing the self-service parcel locker 11 by means of the first driving mechanism and the rotation driving mechanism. After that, the second driving mechanism 25 slides along the guide rail, and the parcel on the first support 251 and the second support 252 may be transferred to the insides of the self-service parcel lockers 11.

In order to facilitate the placement of a parcel into the self-service parcel locker 11, a receiving portion 114 for receiving the parcel transferred by the sorting apparatus 2 is provided at the bottom of the self-service parcel locker 11. The height of the receiving portion 114 is greater than the heights of the first support 251 and the second support 252. The width of the receiving portion 114 is smaller than the width between the first support 251 and the second support 252. In this way, by adjusting the first driving mechanism, the first support 251 and the second support 252 may be located on both sides of the receiving portion 114 respectively, and the parcel may be placed on the receiving portion 114. After that, the first driving mechanism is adjusted so that the heights of the first support 251 and the second support 252 are lower than the upper surface of the receiving portion 114. At this time, the parcel is separated from the first support 251 and the second support 252. Then, the second driving mechanism 25 is adjusted to slide along the guide rail and leave the self-service parcel locker. It could be understood that the receiving portion 114 only needs to include a structure that is higher than the first support 251 and the second support 252 and a parcel can be placed thereon. The specific structure of the receiving portion 114 is not limited in the present disclosure.

Further, the second driving mechanism 25 may further include a third support 253 and a fourth support 254. The third support 253 and the fourth support 254 are located above the first support 251 and the second support 252 and on both sides away from each other, and the width between the third support 253 and the fourth support 254 is greater than the widths of the parcel. In this way, the position of the parcel placed on the first support 251 and the second support 252 may be limited between the left and right, to prevent falling.

It should be noted that, in order to facilitate the mounting stability of the first driving mechanism, four guide rods 223 may be provided, any three of the four guide rods are not collinear, and four corresponding sliding components 241 are provided, as shown in FIG. 2.

In this embodiment, the specific structure of the lifting mechanism 23 is not limited in the present disclosure. For example, the lifting mechanism 23 may be a scissors lifting mechanism. The structure of the scissors lifting mechanism is a well-known technology that is widely studied and applied at present, and details are not described herein again.

It should be noted that the rotation driving mechanism, the first driving mechanism, and the second driving mechanism may also adopt existing structures that can respectively realize rotation, vertical movement, and horizontal movement. For example, the first driving mechanism may also be a scissors lifting mechanism, which is fixed to the base of the rotation driving mechanism to drive the second driving mechanism to ascend and descend.

In some optional implementation modes of this embodiment, the parking apparatus 3 is communicatively connected with the control apparatus.

Figure 4:
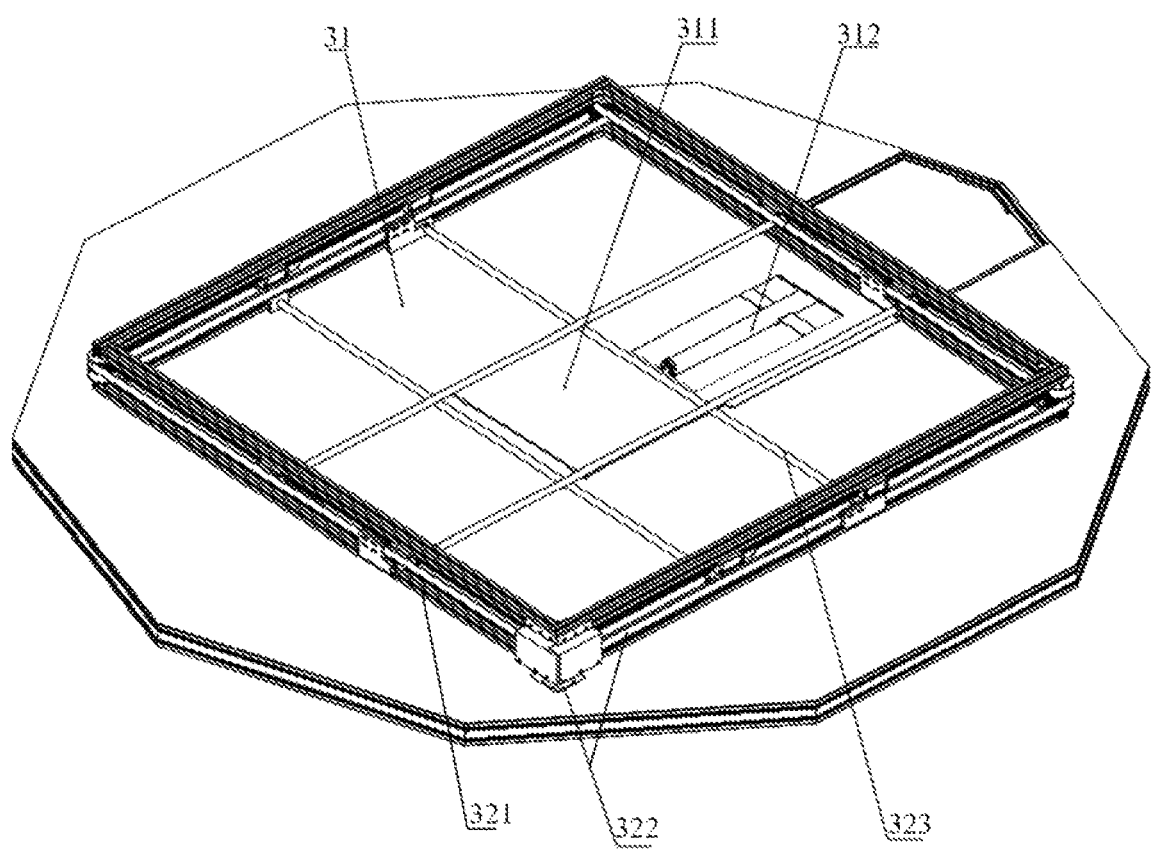
FIG. 4 is a schematic structural diagram of a position adjusting apparatus of the self-service parcel cabinet according to an embodiment of the present disclosure.

Further, referring to FIG. 4, the drone landing pad 31 may include an openable hatch 311, and the hatch 311 faces the opening at the top of the main-body part 1 directly. Generally, the center of the drone landing pad 31 faces the opening at the top of the main-body part directly, and therefore, the hatch 311 may be provided at the position of the center of the drone landing pad 31. The drone landing pad 31 is capable of, when receiving a first opening or closing instruction transmitted by the control apparatus, opening or closing the hatch 311 according to the first opening or closing instruction, to facilitate the delivery of parcels. As an example, a guide rail and a linear actuator 312 may be provided on the drone landing pad 31, the hatch 311 is connected to the linear actuator 312, and the linear actuator 312 controls the hatch 311 to slide along the guide rail to realize opening and closing.

In some optional implementation modes of this embodiment, continuing to refer to FIG. 1, the parking apparatus 3 may further include a position adjusting apparatus 32. The position adjusting apparatus 32 may adjust, when the drone lands on the drone landing pad, the position of the drone according to an adjustment instruction transmitted by the control apparatus and received by the parking apparatus 3. The drone can be adjusted to a position facing the channel of the drone landing pad 31, so as to unload the parcels delivered by the drone to the sorting apparatus 2.

Figure 5:
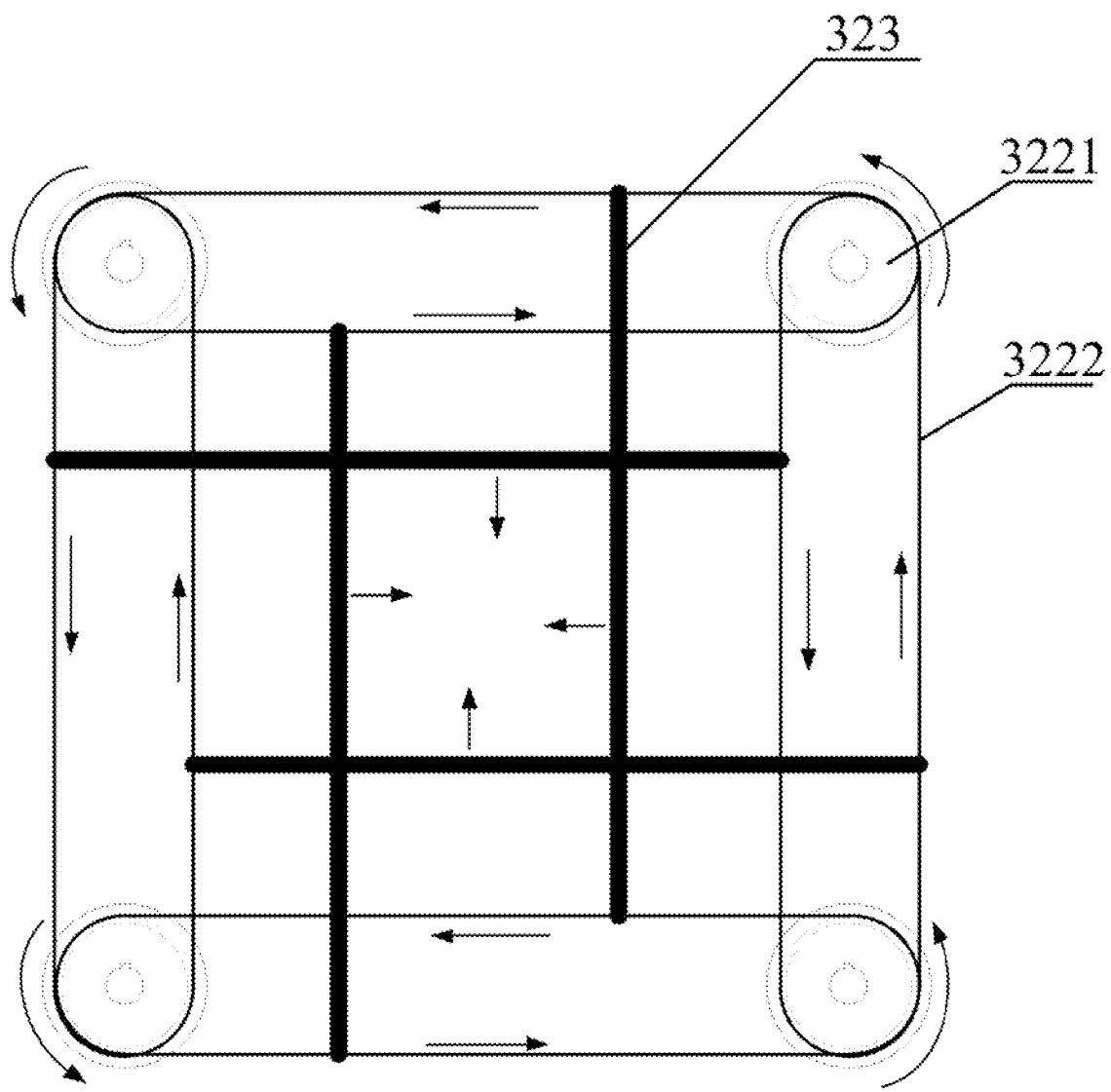
FIG. 5 is a principle diagram corresponding to a top view of the position adjusting apparatus of the self-service parcel cabinet according to an embodiment of the present disclosure.

Optionally, referring to FIG. 4 and FIG. 5, the position adjusting apparatus 32 may include a transmission mechanism 322 and push rods 323. The transmission mechanism 322 may be mounted on a side of the drone landing pad 31, to drive the push rods 323 to move. Optionally, the position adjusting apparatus 32 may further include a mounting frame 321. The mounting frame 321 may be fixed on the drone landing pad 31, and then the transmission mechanism 322 is mounted on the mounting frame 321. The transmission mechanism 322 may include a motor (not shown), four rollers 3221 and four conveyor belts 3222. The four rollers 3221 are respectively located on four rectangular vertices of the drone landing pad 31, and the conveyor belts 3222 are respectively sleeved on every two adjacent rollers 3221. A rotating shaft of the motor is connected to one of the rollers 3221, which is a driving roller and is capable of driving the conveyor belts and the other three rollers to move under the drive of the motor.

Four push rods 323 may be provided in a tic-tac-toe shape. Two ends of the each push rod 323 are respectively connected to the opposite conveyor belts 3222, for example, connected to the conveyor belts 3222 by buckles. In this way, the conveyor belts 3222 may drive the push rods 323 to simultaneously move toward or away from the center of the drone landing pad 31. In the actual working process, continuing to refer to FIG. 5, when the drone does not land on the drone landing pad 31, the four push rods 323 are respectively located at edge positions of the drone landing pad 31 in four directions. When the drone lands on the drone landing pad 31, the rollers 3221 rotate (for example, the rollers rotate counterclockwise as shown in FIG. 5) under the drive of the motor, and the rollers 3221 drive the conveyor belts 3222 to move along the arrow directions shown in FIG. 5. The two ends of each push rod 323 are respectively connected to the opposite conveyor belts 3222 that move in the same direction. Therefore, the conveyor belts 3222 may drive the four push rods 323 to move toward the arrow directions shown in FIG. 5, that is, toward the center of the drone landing pad 31, and to push the drone to the middle position of the drone landing pad 31, that is, the position facing the hatch 311. Similarly, when the rollers 3221 rotate clockwise, each push rod 323 moves away from the middle position.

In some optional implementations of this embodiment, continuing to refer to FIG. 1, the parking apparatus 3 may further include an openable rain shed 33. The rain shed 33 is capable of, when receiving a second opening or closing instruction transmitted by the control apparatus, opening or closing according the first opening or closing instruction. When the rain shed 33 is opened, it covers the drone landing pad 31, which can achieve the effect of rain and sun protection. When the rain shed 33 is closed, it can be located on one side of the drone landing pad 31 to prevent the impact on the landing of the drone. The specific structure of the rain shed 33 is not limited in the present disclosure. For example, the rain shed 33 may include guide rails fixed on two opposite sides of the top of the main-body part 1, a support apparatus slidable along the guide rails, and a rain cloth, where the rain cloth is arranged on the support apparatus. The rain shed 33 further includes a driving apparatus that drives the support apparatus to slide along the guide rails. Under the drive of the driving apparatus, the support apparatus moves to realize the opening and closing of the rain shed 33. It can be understood that when the support apparatus slides along the guide rails to both ends of the guide rails, the rain shed is opened. When the support apparatus slides toward one ends of the guide rails, the rain shed 33 is closed. For another example, the rain shed 33 may further include a storage apparatus fixed on one side of the drone landing pad 31, two retractable mechanical arms, and a rain cloth. The two mechanical arms are fixed on both sides of the storage apparatus, and the rain cloth is fixed on the two mechanical arms. In this way, the opening and closing of the rain shed can be realized by means of extension and retraction of the mechanical arms. When the mechanical arms retract, the rain cloth may be stored in the storage apparatus.

The structure of the mechanical arms is a well-known technology that is widely studied and applied at present, and details are not described herein again.

In some optional implementations of this embodiment, continuing to refer to FIG. 1, the self-service parcel cabinet further includes an unmanned vehicle garage 4. The unmanned vehicle garage 4 is communicated with the hollow structure of the main-body part 1. In this way, when an unmanned vehicle is parked in the unmanned vehicle garage 4, the sorting apparatus 2 may transfer, according to the received second sorting instruction transmitted by the control apparatus, a received parcel delivered by the drone to the unmanned vehicle. It is understandable that a plurality of self-service parcel lockers may also be provided on the unmanned vehicle, and a parcel can be transferred to a corresponding self-service parcel locker by the sorting apparatus. The specific location of the unmanned vehicle garage 4 is not limited in the present disclosure. For example, the unmanned vehicle garage 4 may be provided outside the main-body part 1 or inside the main-body part.

Optionally, a charging apparatus may be provided in the unmanned vehicle garage 4, for charging the unmanned vehicle. The charging apparatus may be a wired charging apparatus or a wireless charging apparatus.

In some optional implementations of this embodiment, continuing to refer to FIG. 1, a display screen 12 for human-computer interaction may also be provided on the outer side of the main-body part 1. The display screen 12 may be used by a user to carry out operations such as self-pickup of a parcel, for example, the user may input a pickup code on the display screen 12 to open the locker door 111 of the corresponding self-service parcel locker 11, and pick up the parcel. The parcel-pickup implemented via the display screen 12 is a well-known technology that is widely studied and applied at present, and details are not described herein again.

In some optional implementation modes of this embodiment, continuing to refer to FIG. 1 and FIG. 3, a skirt hem 13 is provided at the top of the main-body part 1, and a lighting apparatus 14 is provided on the skirt hem 13 to provide users with light under bad light conditions. Since the locker doors of the self-service parcel lockers 11 are located on all sides of the main-body part 1, a plurality of lighting apparatuses 14 may be provided on the skirt hem 13 at intervals.

Described above are merely preferred embodiments of the present disclosure and technical principles used. It should be appreciated by those skilled in the art that the scope of the invention related in the present disclosure is not limited to a technical scheme formed by a specific combination of the above technical features, and at the same time, it also should cover other technical schemes formed by any combination of the above technical features or equivalent features thereof without leaving the inventive concept. For example, a technical scheme formed by mutual replacement between the above features and technical features with similar functions disclosed by (but not limited to) the present disclosure.

What is claimed is:

1. A self-service parcel cabinet, comprising: a main-body part, a sorting apparatus, a parking apparatus and a control apparatus;
    the main-body part is a hollow structure with an opening at top, and at least part of the hollow structure is formed by a plurality of self-service parcel lockers surroundingly arranged;
    the parking apparatus is provided on the top of the main-body part and comprises a drone landing pad for parking a drone, and a channel is provided at the drone landing pad, the channel allowing passing of a parcel delivered by the drone and directly facing the opening at the top;
    the sorting apparatus is provided within the hollow structure, communicatively connected with the control apparatus, and is configured to receive, in response to receiving a parcel receiving instruction transmitted by the control apparatus, the parcel delivered by the drone according to the parcel receiving instruction, and transfer, in response to receiving a first sorting instruction transmitted by the control apparatus, the received parcel into a self-service parcel locker of the self-service parcel cabinet according to the first sorting instruction,
    wherein the sorting apparatus comprises a pallet, a rotation driving mechanism, a lifting mechanism, a first driving mechanism, and a second driving mechanism;
    the pallet is mounted on the lifting mechanism and configured to receive the parcel delivered by the drone;
    the lifting mechanism is mounted on the first driving mechanism and configured to drive the pallet to ascend and descend in the vertical direction;
    the first driving mechanism is mounted on the rotation driving mechanism, and the rotation driving mechanism is capable of driving the first driving mechanism to rotate about an axis parallel to the vertical direction; and
    the second driving mechanism is mounted on the first driving mechanism, the second driving mechanism is driven by the first driving mechanism to move in the vertical direction, and the second driving mechanism is located above the lifting mechanism and is movable in the horizontal direction to transfer the parcel received by the pallet to the self-service parcel locker of the self-service parcel cabinet.

2. The self-service parcel cabinet according to claim 1, wherein the rotation driving mechanism comprises a base, a bottom plate, a top plate, and at least two guide rods;
    the bottom plate and the top plate are arranged opposite to each other up and down, the bottom plate is mounted on the base and is capable of rotating about a central axis perpendicular to the base, and the top plate is provided with a through hole allowing the pallet to pass through;
    two ends of the guide rods are respectively fixed on the bottom plate and the top plate; and
    the first driving mechanism is slidably connected to the guide rods.

3. The self-service parcel cabinet according to claim 2, wherein the top plate comprises a first top plate, at least three rollers, and a second top plate sequentially arranged from bottom to top;
    an upper surface of the second top plate is fixed on the drone landing pad, and the guide rods are fixed on a lower surface of the first top plate;
    the at least three rollers are held on an upper surface of the first top plate, and the at least three rollers are located on the same circumference whose center is on the central axis; a circular groove is provided on a lower surface of the second top plate, and the rollers are located in the circular groove and are capable of rolling along the circular groove; or
    the at least three rollers are held on the lower surface of the second top plate, and the at least three rollers are located on the same circumference whose center is on the central axis; a circular groove is provided on the upper surface of the first top plate, and the rollers are located in the circular groove and are capable of rolling along the circular groove.

4. The self-service parcel cabinet according to claim 2, wherein the first driving mechanism comprises sliding components, a bracket with a guide rail, and a supporting component;
the number of the sliding components matches the number of the guide rods, and the sliding components are slidably connected to the at least two guide rods respectively;
the bracket is mounted on the sliding components and located between the at least two guide rods, and the second driving mechanism is mounted on the guide rail and is capable of sliding along the guide rail; and
the supporting component is mounted on the bracket, and the lifting mechanism is mounted on the supporting component.

5. The self-service parcel cabinet according to claim 4, wherein the second driving mechanism comprises a first support and a second support arranged at the same height;
the space between the first support and the second support is capable of allowing the pallet to ascend or descend; the pallet descends under the action of the lifting mechanism when receiving the parcel, and the parcel is placed on the first support and the second support; and
the bottom of the self-service parcel locker is provided with a receiving portion for receiving the parcel transferred by the sorting apparatus, the height of the receiving portion is greater than the heights of the first support and the second support, and the width of the receiving portion is smaller than the width between the first support and the second support.

6. The self-service parcel cabinet according to claim 5, wherein the second driving mechanism further comprises a third support and a fourth support; and
the third support and the fourth support are located above the first support (and the second support and on both sides away from each other, the width between the third support and the fourth support is greater than the width of the parcel.

7. The self-service parcel cabinet according to claim 1, wherein the cross section of the outside surface of the main-body part is polygonal.

8. The self-service parcel cabinet according to claim 1, wherein a display screen for human-computer interaction is further provided on the outside surface of the main-body part.

9. The self-service parcel cabinet according to claim 1, wherein a skirt hem is provided on the top of the main-body part, and a lighting apparatus is provided on the skirt hem.

10. A self-service parcel cabinet, comprising: a main-body part, a sorting apparatus, a parking apparatus and a control apparatus;
the main-body part is a hollow structure with an opening at top, and at least part of the hollow structure is formed by a plurality of self-service parcel lockers surroundingly arranged;
the parking apparatus is provided on the top of the main-body part and comprises a drone landing pad for parking a drone, and a channel is provided at the drone landing pad, the channel allowing passing of a parcel delivered by the drone and directly facing the opening at the top;
the sorting apparatus is provided within the hollow structure, communicatively connected with the control apparatus, and is configured to receive, in response to receiving a parcel receiving instruction transmitted by the control apparatus, the parcel delivered by the drone according to the parcel receiving instruction, and transfer, in response to receiving a first sorting instruction transmitted by the control apparatus, the received parcel into a self-service parcel locker of the self-service parcel cabinet according to the first sorting instruction,
wherein the parking apparatus is communicatively connected with the control apparatus,
wherein the parking apparatus further comprises a position adjusting apparatus; and
the position adjusting apparatus is configured to, when the drone lands on the drone landing pad, in response to receiving an adjustment instruction transmitted by the control apparatus, adjust the drone to a position directly facing the channel according to the adjustment instruction.

11. The self-service parcel cabinet according to claim 10, wherein the drone landing pad comprises an openable hatch, and the hatch is directly facing the opening at the top of the main-body part; and
the drone landing pad is configured to, in response to receiving a first opening or closing instruction transmitted by the control apparatus, open or close the hatch according to the first opening or closing instruction.

12. The self-service parcel cabinet according to claim 10, wherein the position adjusting apparatus comprises a transmission mechanism and push rods; and
the transmission mechanism is mounted on the drone landing pad and configured to drive the push rods to move so as to push the drone and adjust the position of the drone.

13. The self-service parcel cabinet according to claim 12, wherein the transmission mechanism comprises a motor, four rollers, and four conveyor belts;
the four rollers are respectively located on four rectangular vertices of the drone landing pad, the conveyor belts are respectively sleeved on every two adjacent rollers, and a rotating shaft of the motor is connected with one of the rollers to drive the roller to rotate and drive the conveyor belts and the other three rollers to move; and
four push rods are provided arranged in a tic-tac-toe shape, and two ends of each push rod are respectively connected to the opposite conveyor belts, so that the conveyor belts are capable of driving each push rod to simultaneously move toward or away from the center of the drone landing pad.

14. The self-service parcel cabinet according to claim 10, wherein the parking apparatus further comprises an openable rain shed; and
the rain shed is configured to, in response to receiving a second opening or closing instruction transmitted by the control apparatus, open or close according to the second opening or closing instruction, the rain shed is opened to cover the drone landing pad, and the rain shed is closed to be located on one side of the drone landing pad.

15. A self-service parcel cabinet, comprising: a main-body part, a sorting apparatus, a parking apparatus and a control apparatus;
the main-body part is a hollow structure with an opening at top, and at least part of the hollow structure is formed by a plurality of self-service parcel lockers surroundingly arranged;
the parking apparatus is provided on the top of the main-body part and comprises a drone landing pad for parking a drone, and a channel is provided at the drone landing pad, the channel allowing passing of a parcel delivered by the drone and directly facing the opening at the top;

the sorting apparatus is provided within the hollow structure, communicatively connected with the control apparatus, and is configured to receive, in response to receiving a parcel receiving instruction transmitted by the control apparatus, the parcel delivered by the drone according to the parcel receiving instruction, and transfer, in response to receiving a first sorting instruction transmitted by the control apparatus, the received parcel into a self-service parcel locker of the self-service parcel cabinet according to the first sorting instruction, wherein a back plate of the self-service parcel locker is a retractable baffle;

at least part of the hollow structure is formed by the back plate; and the baffle is communicatively connected with the control apparatus, and is configured to, in response to receiving an extension or retraction instruction transmitted by the control apparatus, extend or retract according to the extension or retraction instruction.

16. A self-service parcel cabinet, comprising: a main-body part, a sorting apparatus, a parking apparatus and a control apparatus;

the main-body part is a hollow structure with an opening at top, and at least part of the hollow structure is formed by a plurality of self-service parcel lockers surroundingly arranged;

the parking apparatus is provided on the top of the main-body part and comprises a drone landing pad for parking a drone, and a channel is provided at the drone landing pad, the channel allowing passing of a parcel delivered by the drone and directly facing the opening at the top;

the sorting apparatus is provided within the hollow structure, communicatively connected with the control apparatus, and is configured to receive, in response to receiving a parcel receiving instruction transmitted by the control apparatus, the parcel delivered by the drone according to the parcel receiving instruction, and transfer, in response to receiving a first sorting instruction transmitted by the control apparatus, the received parcel into a self-service parcel locker of the self-service parcel cabinet according to the first sorting instruction, wherein the self-service parcel cabinet further comprises an unmanned vehicle garage, and the unmanned vehicle garage is communicated with the hollow structure of the main-body part; and the sorting apparatus is further configured to: when an unmanned vehicle is parked in the unmanned vehicle garage, in response to receiving a second sorting instruction transmitted by the control apparatus, transfer the received parcel delivered by the drone to the unmanned vehicle according to the second sorting instruction.

17. The self-service parcel cabinet according to claim 16, wherein a charging apparatus is provided in the unmanned vehicle garage.

* * * * *